2,948,727
Patented Aug. 9, 1960

2,948,727
THIOBISPIPERAZINES

John J. D'Amico, Nitro, W. Va., assignor to Monsanto Chemical Company, St. Louis, Mo., a corporation of Delaware No Drawing. Filed Sept. 30, 1957, Ser. No. 686,862

3 Claims. (Cl. 260—268)

This invention relates to a new class of compounds and more particularly to thiobispiperazines containing in the 4-position a hydrocarbon substituent.

The new compounds may be represented by the structure

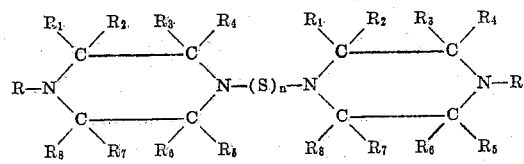

where R represents a hydrocarbon group or halogen substituted derivative thereof, $R_1$, $R_2$, $R_3$, $R_4$, $R_5$, $R_6$, $R_7$ and $R_8$ are selected from the group consisting of hydrogen and lower alkyl and $n$ is an integer at least one but not more than four.

These compounds are conveniently prepared by condensing the corresponding piperazine with a sulfur halide, as for example sulfur monochloride, sulfur dichloride, sulfur monobromide and sulfur dibromide. The substituted piperazines required as intermediates are either known compounds or may be prepared by methods described for analogous materials.

Although the invention is not limited thereto, the following are examples of the new compounds: 1,1'-dithiobis(4-methylpiperazine), 1,1'-thiobis(4-methylpiperazine), 1,1'-dithiobis(4-ethylpiperazine), 1,1'-dithiobis(4-allylpiperazine), 1,1'-thiobis(4-allylpiperazine), 1,1'-dithiobis(4-propylpiperazine), 1,1'-dithiobis(4-isopropylpiperazine), 1,1'-thiobis(4-ethylpiperazine), 1,1'-trithiobis(4-ethylpiperazine), 1,1'-dithiobis(2,4,5-trimethylpiperazine), 1,1'-dithiobis(2,3,4-trimethylpiperazine), 1,1'-dithiobis(2,3-diethyl-4-methylpiperazine), 1,1'-dithiobis(2,2-dimethyl-4-ethylpiperazine), 1,1'-dithiobis(2-ethyl-4-phenylpiperazine), 1,1'-dithiobis(2,2,3,4-tetramethylpiperazine), 1,1'-dithiobis(3-ethyl-2,2,4-trimethylpiperazine), 1,1'-dithiobis(2,2,3,3,4-pentamethylpiperazine), 1,1'-dithiobis(4-benzylpiperazine), 1,1'-dithiobis(4-phenethylpiperazine), 1,1'-dithiobis(4-p-methylbenzylpiperazine), 1,1'-dithiobis(4-octylpiperazine), 1,1'-dithiobis(4-dodecylpiperazine), 1,1'-dithiobis(4-o-tolylpiperazine), 1,1'-dithiobis[4-(2-chloroallyl)piperazine], 1,1'-dithiobis[4-(2-bromoallyl)piperazine], 1,1'-dithiobis[4-(2-fluoroallyl)piperazine], 1,1'-dithiobis(4-propynylpiperazine), 1,1'-dithiobis[4-(2-iodoallyl)piperazine], 1,1'-dithiobis(4-cyclohexylpiperazine), 1,1'-thiobis(4-cyclohexylpiperazine), 1,1'-dithiobis[4-(2-chloroethyl)piperazine], 1,1'-dithiobis(4-o-chlorophenylpiperazine), 1,1'-dithiobis(4-p-bromophenylpiperazine), 1,1'-trithiobis(4-methylpiperazine) and 1,1'-tetrathiobis(4-methylpiperazine). The compounds react with sulfur, taking up additional sulfur, to form higher sulfides. Occasionally, higher sulfides have been identified in reaction products produced directly from sulfur halide condensation. Satisfactory procedures for preparation of the new compounds are illustrated in detail below.

EXAMPLE 1

To a stirred solution containing 81.2 grams (0.5 mole) of 4-phenylpiperazine in 800 ml. of anhydrous ether was added dropwise 16.9 grams (0.125 mole) of sulfur monochloride dissolved in 50 ml. of anhydrous ether at 10–15° C. over a 20 minute period. The ice bath was removed and the reaction mixture was stirred at room temperature for two hours. To the stirred reaction mixture 700 ml. of water was added and stirring continued for 15 minutes. Layers were separated, the ether layer was dried over $Na_2SO_4$ and the ether removed in vacuo. The product, a yellow colored solid, M.P. 100–105° C., was obtained in 82.7% yield. After recrystallization from acetone the 1,1'-dithiobis(4-phenylpiperazine) melted at 117–119° C. Analysis gave 14.45% nitrogen as compared to 14.49% calculated for $C_{20}H_{26}N_4S_2$.

EXAMPLE 2

To a stirred solution containing 200.2 grams (2.0 moles) of N-methylpiperazine in 1000 ml. of anhydrous ethyl ether was added dropwise 67.5 grams (0.5 mole) of sulfur monochloride dissolved in 100 ml. of anhydrous ethyl ether. The temperature of the reaction mixture was kept between 10 and 20° C. during the addition which required about an hour. The reaction mixture was then stirred at 25–30° C. for two hours, cooled to 5° C. and 180 grams of 25% sodium hydroxide and 320 grams of water added dropwise at 5–25° C. The reaction mixture was stirred for 30 minutes. Solids were separated by filtration, washed with 200 ml. of ethyl ether and then with water until neutral to litmus. The product melted at 108–110° C. After recrystallization from heptane, 1,1'-dithiobis(4-methylpiperazine) melted at 118–119° C. Analysis gave 20.76% nitrogen and 24.16% sulfur as compared to 21.35% nitrogen and 24.44% sulfur calculated for $C_{10}H_{22}N_4S_2$.

A further quantity of the same product was recovered from the water and ether filtrates. The ether layer was separated, washed with water until neutral to litmus, dried over sodium sulfate and the ether removed in vacuo. The semi-solid residue was stirred with heptane, cooled to 5° C., filtered and air dried. After recrystallization from heptane the product softened at 102–104° C. and melted at 112–114° C. 1,1'-dithiobis(4-methylpiperazine) is insoluble in water but soluble in common solvents including ether, acetone, chloroform, benzene, heptane, alcohol and ethyl acetate.

EXAMPLE 3

A solution of 200.2 grams (2.0 moles) of N-methylpiperazine in 1000 ml. of heptane was prepared. Four drops of non-ionic surface active agent, prepared by condensing tall oil fatty acids with ethylene oxide, were added. The solution so prepared was stirred at 0° C. while 135 grams (1.0 mole) of sulfur monochloride was added thereto concurrently with 320 grams (2.0 moles) of 25% sodium hydroxide. The addition was adjusted so that the sulfur chloride was at all times slightly in excess of the caustic. The temperature of the reaction mixture was kept at 15° C. during the addition by cooling with an ice-salt bath. After the addition of sulfur chloride and caustic solution, the ice-salt bath was removed, the reaction mixture stirred at room temperature for one hour, 300 ml. of water added and the reaction stirred for 15 minutes. Solids were removed by filtration, washed with water and dried at room temperature. There was obtained 98 grams of 1,1'-dithiobis(4-methylpiperazine), M.P. 108–114° C.

EXAMPLE 4

To a stirred solution containing 200.2 grams (2.0 moles) of N-methylpiperazine in 500 ml. of heptane was added dropwise 51.6 grams (0.5 mole) of distilled (B.P. 57–59° C.) sulfur dichloride dissolved in 100 ml. of heptane. The temperature of the stirred reaction mixture was maintained at 0–10° C. during the addition which required about 30 minutes. After stirring for one hour at 0–10° C., 180 grams of 25% aqueous sodium hydroxide was added dropwise at 10–20° C. Stirring was continued for 15 minutes at 5–10° C., the precipitate collected by filtration, and air dried on a porous plate at 25–30° C. There was obtained 29 grams of a white solid, M.P. 43–50° C. Five grams of the crude product were stirred with 5 ml. of heptane, filtered and air dried at 25–30° C. The purified 1,1′-thiobis(4-methylpiperazine), a white solid, melted at 57–59° C. Analysis gave 19.5% nitrogen as compared to 19.7% calculated for $C_{10}H_{22}N_4S \cdot 3H_2O$. Upon standing the product became hygroscopic.

A further quantity of the same product was recovered from the water and heptane filtrate. The heptane layer was separated, dried over sodium sulfate and the solvent removed in vacuo. The resulting semi-solid was dried on a porous plate to yield an additional 13 grams of product, M.P. 53–57° C. The total yield was 29.5%. The product is soluble in water, ether, acetone, chloroform, benzene, alcohol, ethyl acetate and hot heptane.

EXAMPLE 5

A solution of 100.1 grams (1.0 mole) of N-methylpiperazine in 500 ml. of heptane was prepared. To this solution at 0–5° C. was added concurrently 51.6 grams (0.5 mole) of distilled sulfur dichloride dissolved in 100 ml. of heptane and 160 grams (1.0 mole) of 25% aqueous sodium hydroxide. The addition was adjusted so that the sulfur dichloride was at all times slightly in excess of the caustic. After stirring for one hour at 25–30° C., 150 ml. of water, 50 ml. of ethyl ether and enough sodium chloride to saturate the aqueous layer were added to the stirred reaction mixture. The top organic layer was separated, dried over sodium sulfate and the solvent removed in vacuo. The product was slurried with a small amount of heptane, filtered and air dried on a porous plate at 25–30° C. The purified 1,1′-thiobis(4-methylpiperazine), a white solid, melted at 57–59° C. Analysis gave 19.14% nitrogen and 11.45% sulfur as compared to 19.7% nitrogen and 11.27% sulfur calculated for $C_{10}H_{22}N_4S \cdot 3H_2O$.

As disclosed in co-pending application Serial No. 412,376, filed February 24, 1954, now U.S. Patent No. 2,808,409, of which the present application is a continuation-in-part, the new compounds are efficient accelerators and vulcanizing agents for rubber and synthetic elastomers. Additionally, those compounds having a non-aromatic group in the 4-position are excellent insecticides. For this purpose the 4-substituent is preferably a lower alkyl or lower alkenyl group. The remarkable effectiveness of this class is illustrated by 1,1′-dithiobis(4-methylpiperazine) which gave 100% kill of mobile and high or substantial kill of resting and egg stages of spider mites at rates as low as one-half to one-fourth pounds per acre. On the other hand, toxicity to warm blooded animals is low. The acute oral $LD_{50}$ to rats is 1150 mg./kg.

Aqueous emulsions of 1,1′-dithiobis(4-methylpiperazine) were prepared by dissolving the compound in acetone, adding water and an emulsifying agent and agitating the mixture until a uniform dispersion was produced. The aqueous dispersions were applied to bean plants previously infested with two-spotted spider mites. After the plants were thoroughly sprayed to run-off they were permitted to drain and dry and placed on constant water level test-holding benches. A leaf was excised 48 hours after treatment for observation of mobile stage mortality. A second leaf was excised 7 days after treatment for observation of activity against resting stages and eggs and for residual effectiveness. Residual effectiveness indicates the overall effectiveness of the chemical. For example, 100% residual effectiveness would mean that no live forms whatsoever were found at the time of the observation. In the table below results are reported as percent mortality corresponding to various dilutions of 1,1′-dithiobis(4-methylpiperazine):

Table 1

| Concentration of spray | Mobile Stage, Percent Mortality | Resting Stage, Percent Mortality | Egg Stage, Percent Mortality | Percent Residual Effectiveness After 1 Week |
| --- | --- | --- | --- | --- |
| 1/1000 | 100 | 97 | 97 | 97 |
| 1/2000 | 100 | 90 | 97 | 90 |
| 1/4000 | 100 | 90 | 50 | 50 |
| 1/8000 | 100 | 97 | 97 | 97 |

This compound also destroyed 97% of yellow fever mosquito larvae at a concentration of 10 parts per million.

For use on living plants the new compounds are preferably applied as aqueous solutions or dispersions. The addition of surface active agents aids the preparation of dispersions or emulsions from compounds insoluble in water. Emulsifiable concentrates of the water insoluble compounds, prepared by dissolving the toxicant and emulsifying agent in a water miscible solvent, are especially convenient for formulation of agricultural sprays. Alternatively, the compounds may be applied as dusts wherein the active ingredient is distributed over a dry, free-flowing powder, as for example clays, including bentonite and attapulgite; or such materials as talc, diatomaceous earth, fuller's earth, chalk or calcium carbonate. The required concentrations of active ingredient are small because of the high effectiveness of the new compounds. Sprays for application to agricultural crops may suitably be applied at concentrations of 0.001–1.0%.

It is intended to cover all changes and modifications of the examples of the invention herein chosen for purposes of disclosure which do not constitute departures from the spirit and scope of the invention.

What is claimed is:

1. A compound selected from the group consisting of compounds of the structure

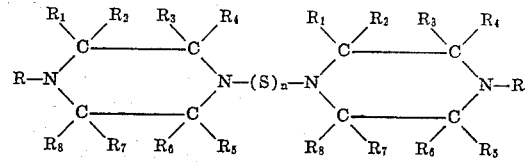

where R is selected from the group consisting of a methyl group and halogen substituted allyl, $R_1$, $R_2$, $R_3$, $R_4$, $R_5$, $R_6$, $R_7$ and $R_8$ are selected from the group consisting of hydrogen and lower alkyl and $n$ is an integer at least two but not more than four and acid addition salts thereof.

2. Thiobis(4-methylpiperazine) in which a sulfur bridge containing at least two but not more than four sulfur atoms is linked to the nitrogen atom.

3. 1,1′-dithiobis(4-methylpiperazine).

References Cited in the file of this patent

UNITED STATES PATENTS

| | | |
|---|---|---|
| 2,766,236 | Harman | Oct. 9, 1956 |
| 2,808,409 | D'Amico | Oct. 1, 1957 |
| 2,835,670 | Hardman | May 20, 1958 |